United States Patent
Umezawa et al.

[19]

[11] Patent Number: 6,073,511
[45] Date of Patent: Jun. 13, 2000

[54] SHIFT CHANGING DEVICE FOR TORQUE CONVERTER

[75] Inventors: Kazunori Umezawa; Takehide Sato, both of Saitama, Japan

[73] Assignee: Toyodenso Kabushiki Kaisha, Tokyo, Japan

[21] Appl. No.: 09/116,948

[22] Filed: Jul. 17, 1998

[30] Foreign Application Priority Data

Jul. 18, 1997 [JP] Japan .................................... 9-193585

[51] Int. Cl.[7] .................................................. B60K 20/00
[52] U.S. Cl. ................................... 74/473.25; 74/473.25; 74/473.32; 74/473.27
[58] Field of Search ........................... 74/473.25, 473.32, 74/473.27, 473.24, 850, 527, 337.5

[56] References Cited

U.S. PATENT DOCUMENTS

| | | | |
|---|---|---|---|
| 4,821,605 | 4/1989 | Dzioba | 74/850 |
| 4,934,208 | 6/1990 | Carlstrom | 74/473.32 X |
| 5,280,732 | 1/1994 | Katsumata et al. | 74/473.32 |
| 5,309,787 | 5/1994 | Soyka et al. | 74/527 |
| 5,613,584 | 3/1997 | Bremner | 74/473.32 X |

Primary Examiner—David A. Bucci
Assistant Examiner—Colby Hansen
Attorney, Agent, or Firm—Birch, Stewart, Kolasch & Birch, LLP

[57] ABSTRACT

A tip of the shift lever 5 is connected with the head member 10 and is freely swingable in the up and down directions around the second swing center axis 12 and is made integrally with the head member 10 to swing freely in the right and left directions around the first swing center axis 6. While the click ball 18 in a tip of the head member 10 is pushed against the click groove 19, the rotating position of the shift lever 5 is engaged with any one position of the neutral N, the first forward position F1, the second forward position F2, the first reverse position R1, or the second reverse position R2 and the shift switch is changed corresponding to each position by the tip of the head member 10. The engaging plate 25 provided on the tip of the shift lever 5 controls so that when the first engaging portion 26 is abutted against the step changing portion 36 or 37 of the step-like guide 31, the shift lever 5 can not be continuously swung unless the sift lever 5 is made to swing upwardly and run on to the upper step 34 or 35. When the shift lever 5 is swung upwardly, the second engaging portion 27 falls to the side of the jumping control projection 32 and when the shift lever 5 is returned to the direction of the neutral position on the upper step 34 or 35, the second engaging portion 27 makes the shift lever 5 to stop to rotate till it falls down to the lower step 33.

10 Claims, 8 Drawing Sheets

ND DEVICE FOR TORQUE
SHIFT CHANGING DEVICE FOR TORQUE CONVERTER

BACKGROUND OF THE INVENTION

1. Field of the Invention

The present invention relates to a multistage shift changing device for a torque converter suitable for an industrial vehicle such as a fork-lift.

2. Description of the Prior Art

The shift changing device for a torque converter used for a conventional fork-lift or the like comprises a plurality of the levers for changing to forward or reverse and for the shift changing and the shift has been changed by combining each levers.

There is a case required to change said shift in the neighborhood of the steering wheel. But, in this case, since there are already other levers such as for lamp switches, it is not preferable to provide a plurality of the shift levers in the neighborhood of the steering wheel, hence the lever is required to be one. However, in the case of one shift lever, because it tends to cause an erroneous operation such as swinging the shift lever in plural steps at a time from the neutral position to the second forward position, such a erroneous operation must be prevented. The present invention satisfies said requirement.

SUMMARY OF THE INVENTION

In order to solve the above subject, the first invention of the present application is characterized in a shift changing device for a torque converter, which is changeable in a multistage manner from a neutral position to at least either side of a forward position or reverse position, comprising, a shift lever mounted freely swingable around a steering shaft, and a shift switch operated by swinging the shift lever; wherein a swinging control means is provided to control the shift lever not to successively swing to a multistage position in a same plane.

The second invention is characterized in that, in the first invention above, the swinging control means comprises a guide member changing the height thereof in a step manner to guide the shift lever to a different swinging plane in each shift position.

The third invention is characterized in that, in the second invention above, the swinging control means comprises a jumping control projection to interrupt the shift lever to move from the neutral position toward a swinging plane of one step skipped shift position.

According to the first invention, when the shift lever is intended to swing continuously in a plurality of steps, because the swing of the shift lever is interrupted by the swinging control means at changing positions of the shift, the shift lever stops at each shift position and can not be swung continuously in a multistage on the same plane. With the result of that, even in the case of only one shift lever, the erroneous operation such as one step skipped shift change, which is done in plural steps at a time, can be prevented.

According to the second invention, by constructing the swinging control means of a guide member changing the height thereof in a step-like, the swinging control of said shift lever can be realized in a simple construction.

According to the third invention, still more by providing a jumping control projection as the swinging control means to interrupt a moving of the shift lever from the neutral position to a swinging plane of one step skipped shift position, even when the shift lever is made to swing from the neutral position to the swinging plane of one step skipped shift position, since the swing of the shift lever is controlled by abutting the shift lever against the jumping control projection, the erroneous operation such as changing abruptly from the neutral position to one step skipped shift position can be prevented.

DETAILED DESCRIPTION OF THE PREFERRED EMBODIMENT

Figure 1:
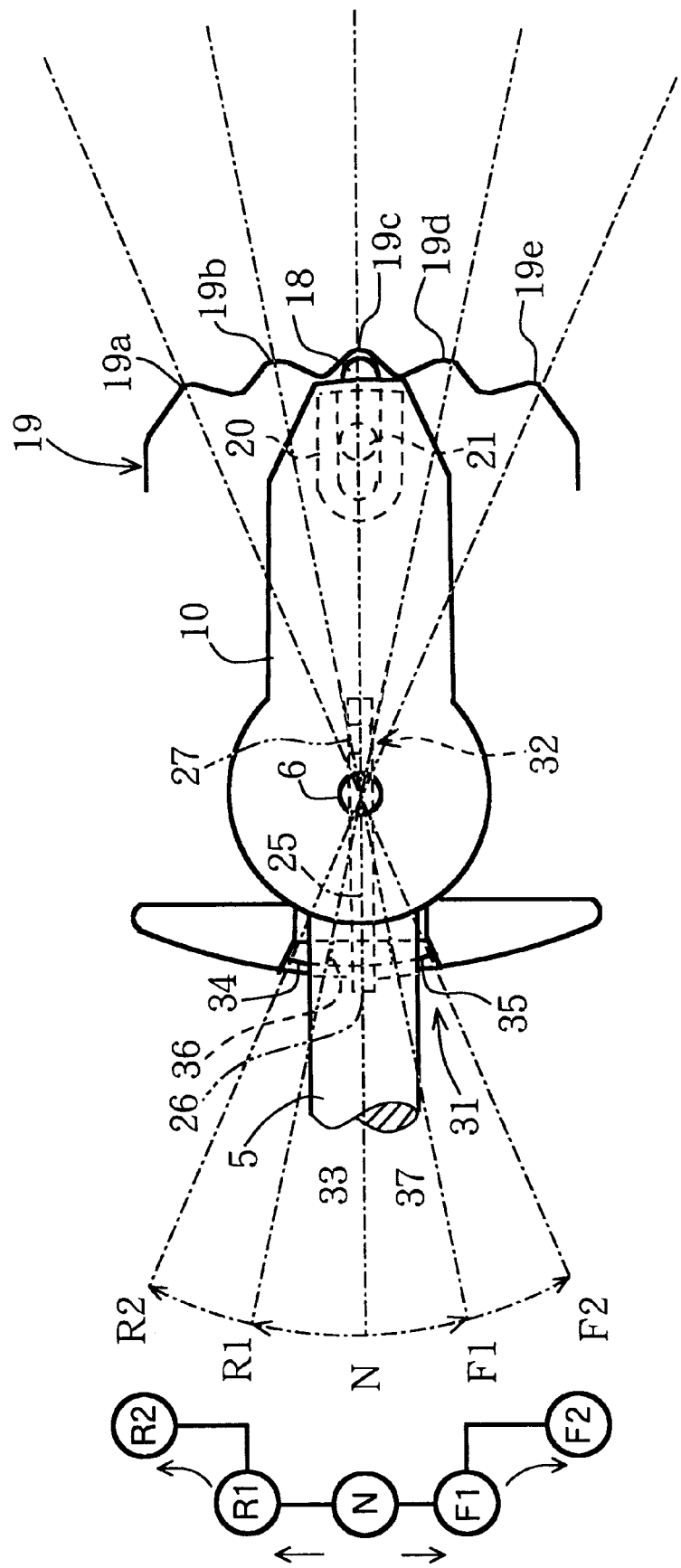
FIG. 1 is a view explaining a function in the shift changing.
Figure 2:
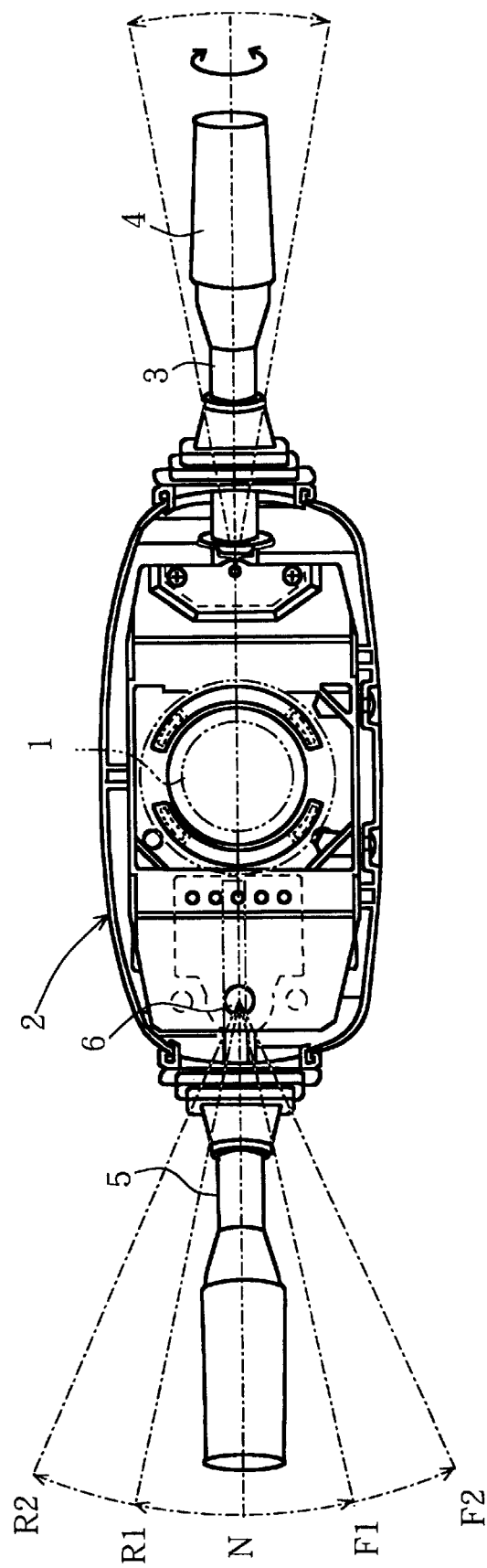
FIG. 2 is a plan view of a combination switch applied with the present embodiment.
Figure 3:
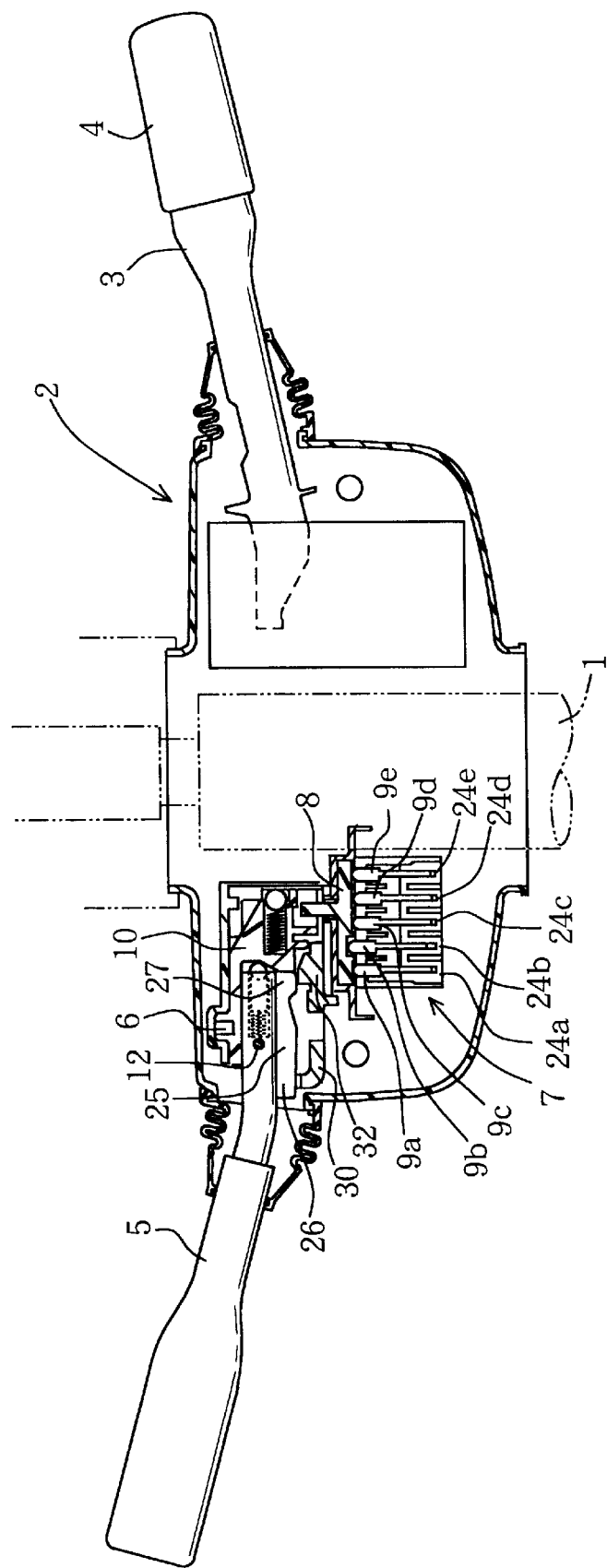
FIG. 3 is a rough sectional view thereof.
Figure 4:
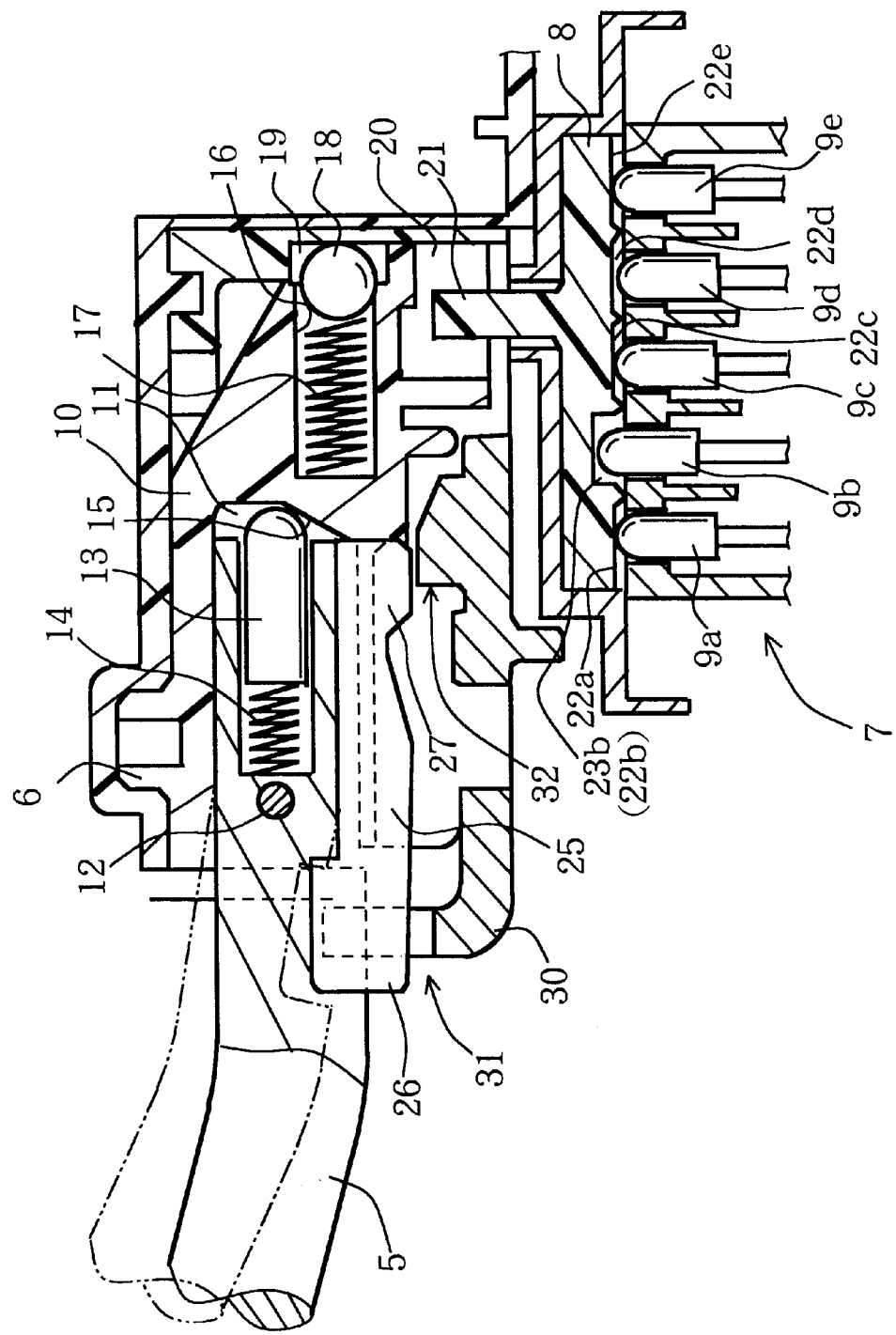
FIG. 4 is an enlarged sectional view of a shift changing device portion.
Figure 5:
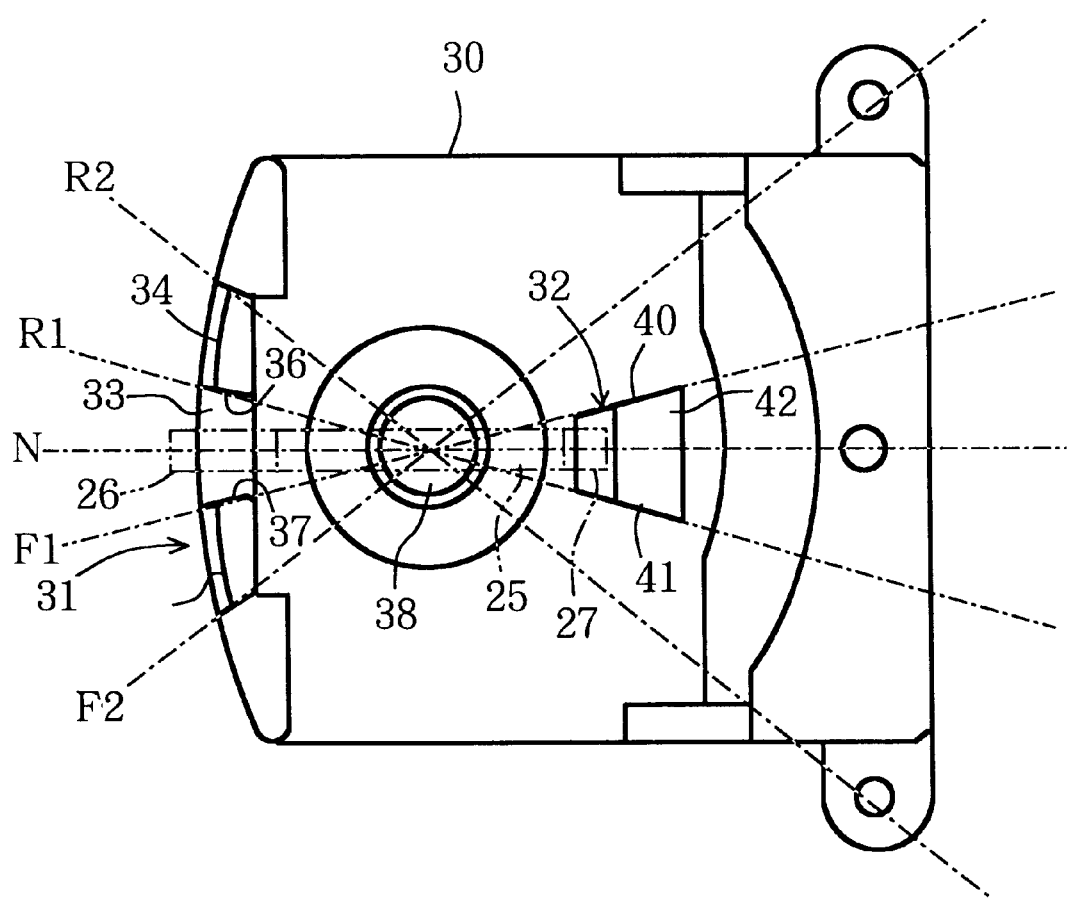
FIG. 5 is a plan view of a housing of the shift changing device.
Figure 6:
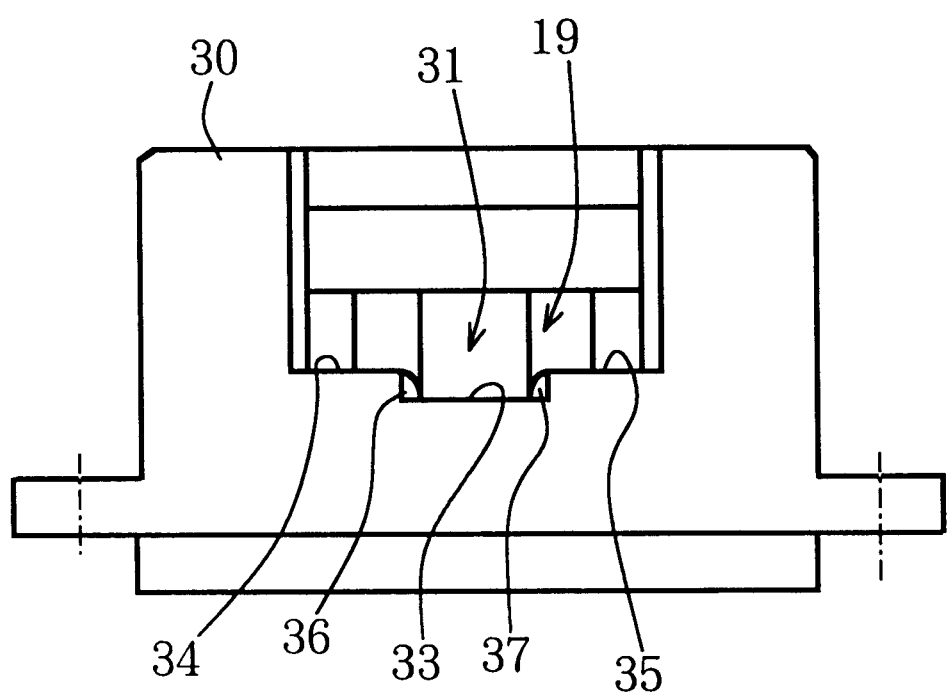
FIG. 6 is a left side view thereof.
Figure 7:
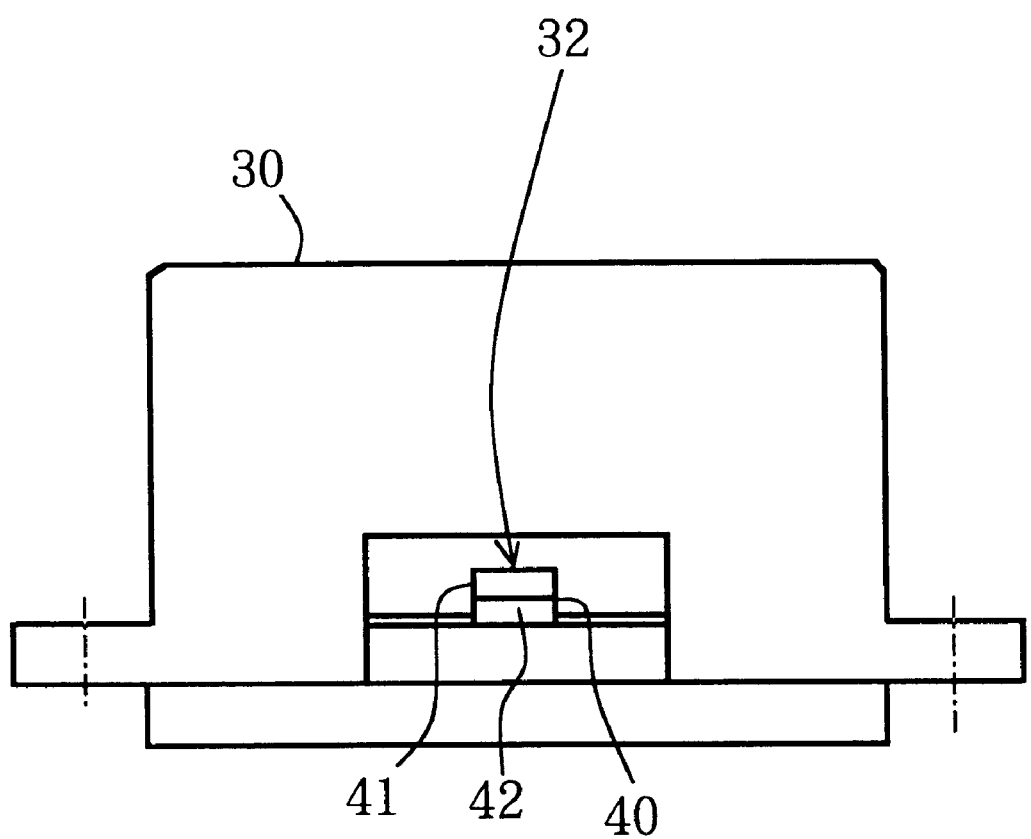
FIG. 7 is a right side view thereof.
Figure 8:
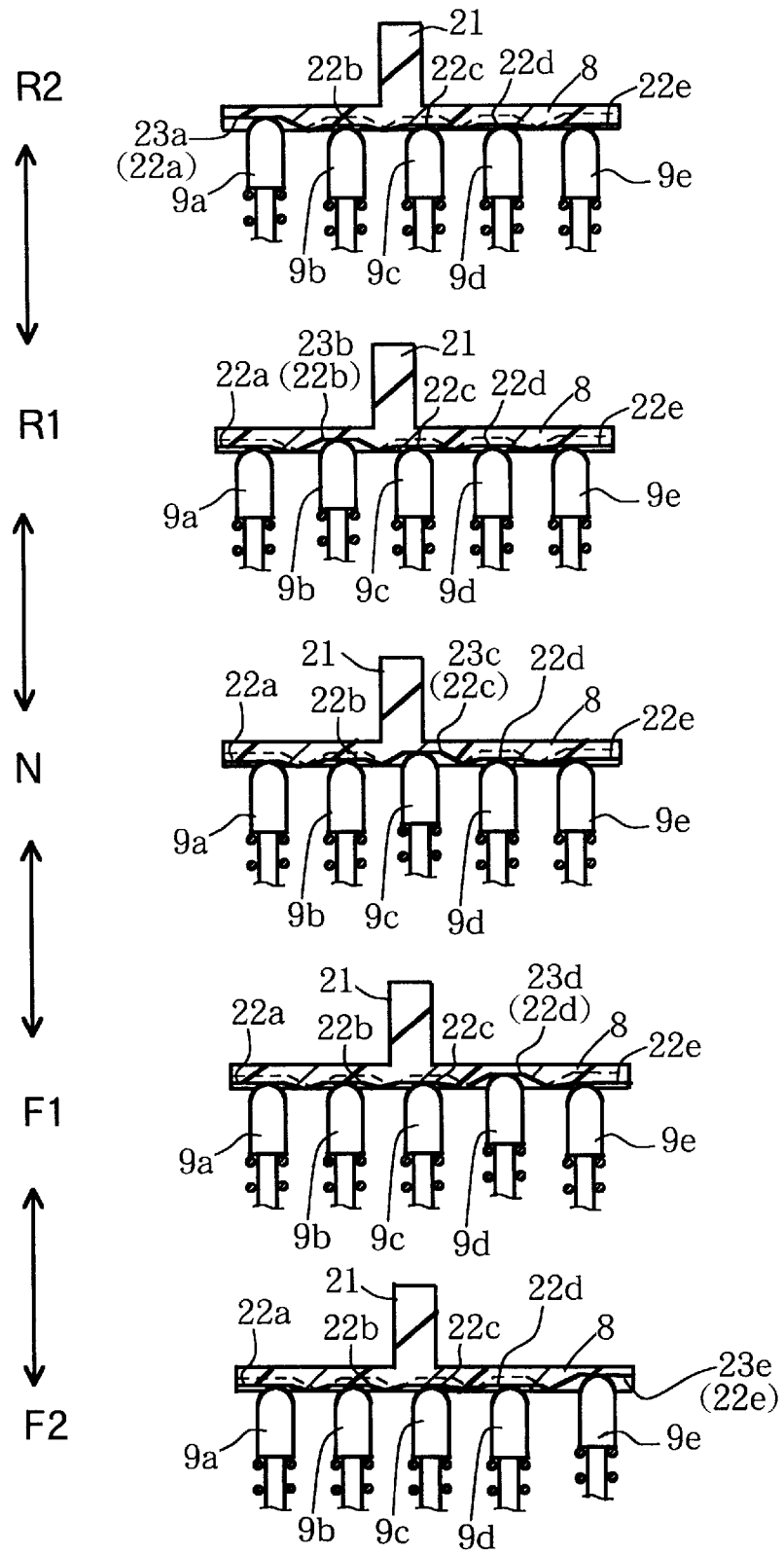
FIG. 8 is a view describing an operation of the shift switch.

An embodiment is illustrated based on FIG. 1 to FIG. 8. FIG. 1 is a view showing a function in the shift change, FIG. 2 is a plan view of a combination switch applied with the present embodiment, FIG. 3 is a rough sectional view thereof, FIG. 4 is an enlarged sectional view of the shift changing device portion, FIG. 5 is a plan view of a housing of the shift change device, FIG. 6 is a left side view thereof, FIG. 7 is a right side view thereof, and FIG. 8 is a view describing an operation of the shift switch.

As is shown in FIG. 2 and FIG. 3, the shift changing device is, as a shift changing device for a torque converter of a fork-lift, installed in a combination switch 2 mounted on the periphery of a steering shaft 1.

A switch lever for lamps is provided on the right side of the combination switch 2. By swinging the switch lever 3 up or down at a predetermined angle, the right and left turn signal lamps can be turned on or off, and when a knob is rotated around an axis, the turning on and off of lamp instruments such as a head lamp can be controlled.

On the left side of the combination switch 2, a shift lever 5 is supported in freely swingable around a first swinging center axis 6 generally in parallel to the steering shaft 1. This shift lever 5 swings two steps downward from a neutral position and the shift position is changed to a first forward position F1 and a second forward position F2 in order. The shift lever 5 swings also two steps upward and the shift position is changed to a first reverse position R1 and a second reverse position R2 in order.

As is apparent in FIG. 3, a shift switch 7 is supported in the combination switch 2 to change by swinging of the shift lever 5. The shift switch 7 comprises a slider 8 interlocking with the shift lever 5 and push rods 9a to 9e moving selectively up and down according to the movement of the slider 8.

As is apparent in FIG. 4, a tip portion of the shift lever 5 is inserted into a hollow portion 11 of a head member 10 and the shift lever 5 is connected to the head member 10 so as to swing freely up and down around the second swing center axis 12. As a tip of the click pin 13, which is inserted in a state of going in and out freely into a shaft hole formed on a tip of the shift lever 5, is urged by a click spring 14 to be pressed toward a slant wall face 15 on a bottom portion of the hollow portion 11, the shift lever 5 is urged to be swung downward to the neutral position.

The head member 10 is formed integrally with the first swing center axis 6 projecting on the top and bottom portion and a click ball 18 is urged to push against a click groove 19 formed on an inner wall face of the combination switch 2 by a click spring 17 housed in a concave portion 16 formed on a tip of the head member 10. The concave portions are formed on the click groove 19 corresponding to each shift position. (See FIG. 1)

A groove portion 20 of a generally U-shaped in a bottom view is formed on a tip of a bottom portion of the head member 10, into which a projecting portion 21 projecting integrally upward from a center portion of the slider 8 is loosely fitted and when the head member 10 swings right and left around the first swing center axis 6, the slider 8 is adapted to move linearly to the right and left direction.

As is shown also in FIG. 8, grooves 22a to 22e are formed linearly in a right and left direction on a rear face of the slider 8 corresponding to the push rods 9a to 9e to slide thereon and each groove 22a to 22e corresponds to one of each of the shift positions.

Namely, supposing that the grooves 22a to 22e correspond in order to R1, R2, N, F1 and F2, concave portions 23a to 23e are formed one by one on each grooves, to which the corresponding push rods 9a to 9e is fitted only when the slider 8 is moved to the respectively corresponding shift position.

Therefore, when the slider 8 is moved to a shift position, any concave portions 23a to 23e formed on any grooves 22a to 22e corresponding to the shift position is located on any corresponding push rods 9a to 9e and the only corresponding one among the push rods 9a to 9e is fitted and is moved upward.

Each push rod 9a to 9e is adapted to selectively turn on or off position switches 24a to 24e corresponding to each shift positions (see FIG. 3) and these position switches 24a to 24e are adapted to control and to change the shift of the not shown torque converter according to on or off position of the switches.

Still more, as is apparent in FIG. 4, an engaging plate 25 is attached on a bottom face of a tip side of the shift lever 5 longitudinally along an axis direction and a first engaging portion 26 and a second engaging portion 27 are provided on both ends of the engaging plate 25 in the axis direction.

The first engaging portion 26 and the second engaging portion 27 are respectively adapted to be able to abut against a step-like guide 31, which is formed integrally with a housing 30 of the shift changing device accommodating the head member 10, and against a jumping control projection 32 of generally trapezoid shaped in plan view. These parts constitute the swinging control means.

As is shown in FIG. 4 and FIG. 6, the step-like guide 31 is formed in a step-like cut out shape on both sides of an axis line of the shift lever 5 at the neutral position. A lower step 33, arranged on the central lowest position, presents a swinging range of the shift lever 5 at the neutral and, when the shift lever is moved to a step changing portion 36 or 37 toward one step higher upper steps 34 or 35, the shift is changed to the first reverse position R1 or first forward position F1 and at the same time, the swinging of the shift lever 5 is controlled.

The upper steps 34 and 35 allow the moving of the shift lever 5 in the time of shift change from the first reverse position R1 or the first forward position F1 to the second reverse position R2 or the second forward position F2.

The jumping control projection 32 is formed symmetrically on an axis line of the neutral position and an extending line of a pair of slant edge portions 40, 41 formed in an outwardly opened shape to cross obliquely in the vicinity of a fitting hole 38 of the first swing center axis 6 to the axis line of the neutral position and are respectively adapted to pass through the first reverse portion R1 or first forward position F1.

The jumping control projection 32 is made to be a slant face 42 which is the highest in the vicinity of the fitting hole 38 and becomes graduately lower toward the tip side. When the shift lever 5 swings in the lower step 33, it is allowed to swing freely without the second engaging portion 27 interfering with the jumping control projection 32. But assuming that the shift lever 5 is made to swing around the second swing center axis 12 in this state, the second engaging portion 27 abuts against the jumping control projection 32.

In a state when the second engaging portion 27 goes down owing to the swinging of the shift lever 5 on the upper step 34 or 35, because the second engaging portion 27 interferes with the jumping control projection 32, the swinging of the shift lever 5 is allowed merely on the outside of each slant edge portions 40, 41 and it is controlled for the swinging of the shift lever 5 to return to the inside of each slant edge portion 40, 41.

Next, the operation of the present embodiment is described. In FIG. 1, when the shift lever 5 is on the neutral position N, the click ball 18 is engaged with the neutral groove 19c of the click groove 19 and the axis line of the shift lever 5 is on the center line connecting each center of the lower step 33, the first swing center axis 6 and the jumping control projection 32.

For instance, when the shift lever 5 is swung to the direction of the first forward position direction, namely, to the counterclockwise direction in FIG. 1 around the first swing center axis 6 in the lower step 33, the first engaging portion 26 of the engaging plate 25 is abutted against the step changing portion 37.

At the same time, the slider 8 is moved by the groove portion 20 of the head member 10 and placed in the F1 position in FIG. 8. At this time, because the push rod 9d is made to go upwardly so as to fit in the concave portion 23d, the position switch 24d is turned on and the torque converter is changed to the first forward position F1.

In this condition, because the second engaging portion 27 is situated over the jumping control projection and does not interfere with the shift lever 5, which can move on the jumping control projection 32. When the shift lever 5 is placed at the first forward position, the second engaging portion 27 goes out of the slant edge portion 40 along it.

In the case of a shift up further from the first forward position F1 to the second forward position F2, someone intends in vain to swing the shift lever 5, because the first engaging portion 26 is abutted against the step changing portion 37. At this time, the shift lever 5 has to be swung upwardly.

Then, the shift lever 5 moves upwardly around the second swing center axis 12 (see FIG. 4). After the shift lever 5 climbs over the step portion 37 and runs on to the upper step 35, it is made to swing freely on the upper step 35. The swing plane of the shift lever 5 on the upper steps 35 or 36 is in parallel and different in height with the swing plane on the lower step 33.

Supposing the shift lever 5 is further swung counterclockwise, it reaches the second forward position F2.

The slider 8 is situated on the second forward position F2 in FIG. 8, hence the torque converter is changed to the second forward position F2.

At this time, the second engaging portion 27 is adapted to drop to the lower position than the first engaging portion 26 on the outside of the slant edge portion 40, owing to the upward moving of the shift lever 5. Therefore, even if someone intends to put the shift lever 5 back to the direction of the neutral position on the upper step 35, since the second engaging portion 27 abuts against the slant edge portion 40, the shift lever 5 is in just the state when it was swung upwardly and is interrupted to further rotate to return.

Therefore, the shift lever 5 can not be returned directly from the second forward position F2 to neutral position and is stopped once at the F1 position. To return to the neutral position, the shift lever 5 must be swung downwardly, namely from the upper step 35 to the lower step 33, hence it can be prevented that the shift lever 5 is returned with one step skipping.

When the shift lever is placed at the neutral position, if someone intends to swing the shift lever 5 upwardly around the second swing center axis 12 and to directly move it to the upper step 34 or 35, the second engaging portion 27 prevents such swinging by abutting against the jumping control projection 32. Therefore, a one step skipped shift change by such an operation of the shift lever 5 can be prevented.

Since the shift changing in the reverse direction is the same as the above mentioned except that the swing direction of the shift lever 5 is reversed, the explanation is omitted.

The present invention is not confined to the embodiments described above, but may be embodied or practiced in various other ways without departing from the spirit or essential character thereof For example, the reverse side changing may be made merely in one step. Moreover, the first engaging portion 26 is not always necessary and the shift lever 5 may directly abut against the step portion 36 or 37.

Further, the engaging plate 25 may be formed integrally with the shift lever 5 and also, the jumping control projection 32 may be formed in another body from the housing 30. Without providing the engaging plate 25 and the housing 30, if an upper extending portion is provided on the step changing portion 36 and 37 of the step-like guide 31 side and the returning rotation of the shift lever 5 is adapted to be temporarily stopped, the same effect can be achieved. Still more, when a number of steps of the step-like guide 31 is increased, it is possible to change the shift in more steps.

What is claimed is:

1. In a shift changing device for a torque converter, which is changeable in a multistage manner from a neutral position to at least either side of a forward position or reverse position, comprising, a shift lever mounted freely swingable around a steering shaft, a shift switch operated by swinging the shift lever; and said shift switch including a slider interlocking with the shift lever, and push rods moving selectively up and down according to the movement of the slider, each push rod being adapted to selectively turn on or off position switches corresponding to each shift position;

wherein a swinging control means is provided to control the shift lever not to successively swing to multistage position in a same plane.

2. The shift changing device for a torque converter in accordance with claim 1, wherein the swinging control means comprises a guide member changing the height thereof in a step manner to guide the shift lever to a different swinging plane in each shift position.

3. The shift changing device for a torque converter in accordance with claim 2, wherein the swinging control means comprises a jumping control projection to interrupt the shift lever to move from the neutral position toward a swinging plane of one step skipped shift position.

4. The shift changing device for a torque converter in accordance with claim 2, wherein the height of the shift lever in a neutral position is at a different elevation as compared to the height of the shift lever in an operative position.

5. The shift changing device for a torque converter in accordance with claim 2, wherein said guide member is a step-like guide for positioning said shift lever in a first position at a first elevation when in a neutral position and in a second position at a second elevation, distinct from said first elevation, when in an operative position.

6. The shift changing device for a torque converter in accordance with claim 1, wherein said swing of the shift lever is interrupted as the shift lever is manually operated from a neutral position to an operative position.

7. The shift changing device for a torque converter in accordance with claim 1, wherein said shift lever and said slider are interconnected to enable movement of said slider upon imparting movement to said shift lever.

8. The shift changing device for a torque converter in accordance with claim 1, wherein said shift lever is movable in a first direction about a first swing center axis and is movable in a second direction about a second swing center axis.

9. The shift changing device for a torque converter in accordance with claim 8, and further including a head member positioned adjacent to said shift lever and a click ball operatively positioned relative to said head member for facilitating the positioning of the shift lever during movement from a neutral position to an operative position.

10. The shift changing device for a torque converter in accordance with claim 9, and further including a groove portion formed in said head member and a projection extending from said slider, said projection extending within said groove portion of said head member for moving said slider upon imparting movement to said head member.

* * * * *